June 4, 1968 A. LENDER 3,387,213

SYNCHRONOUS FREQUENCY MODULATION DUOBINARY PROCESSING OF DIGITAL DATA

Filed Feb. 23, 1965

INVENTOR.
ADAM LENDER

BY

Lippincott, Ralls & Hendricson

ATTORNEYS

United States Patent Office 3,387,213
Patented June 4, 1968

3,387,213

SYNCHRONOUS FREQUENCY MODULATION DUOBINARY PROCESSING OF DIGITAL DATA

Adam Lender, Palo Alto, Calif., assignor, by mesne assignments, to Automatic Electric Laboratories, Inc., Northlake, Ill., a corporation of Delaware Filed Feb. 23, 1965, Ser. No. 434,583
10 Claims. (Cl. 325—163)

ABSTRACT OF THE DISCLOSURE

This invention provides process and apparatus for converting a digital data waveform having a series of pulses at two discrete amplitude levels and a predetermined bit interval T into a frequency-modulated signal for transmission. The frequency-modulated signal is formed of a center frequency and two extreme frequencies symmetrically disposed on opposite sides of the center frequency and separated therefrom by $1/4T$ with one of the extreme frequencies being a carrier having the frequency $k/2T$ wherein $k$ is an integer equal to or greater than 2. The center frequency is defined by the expression $$\frac{2k\pm1}{4T}$$

Figure 1:
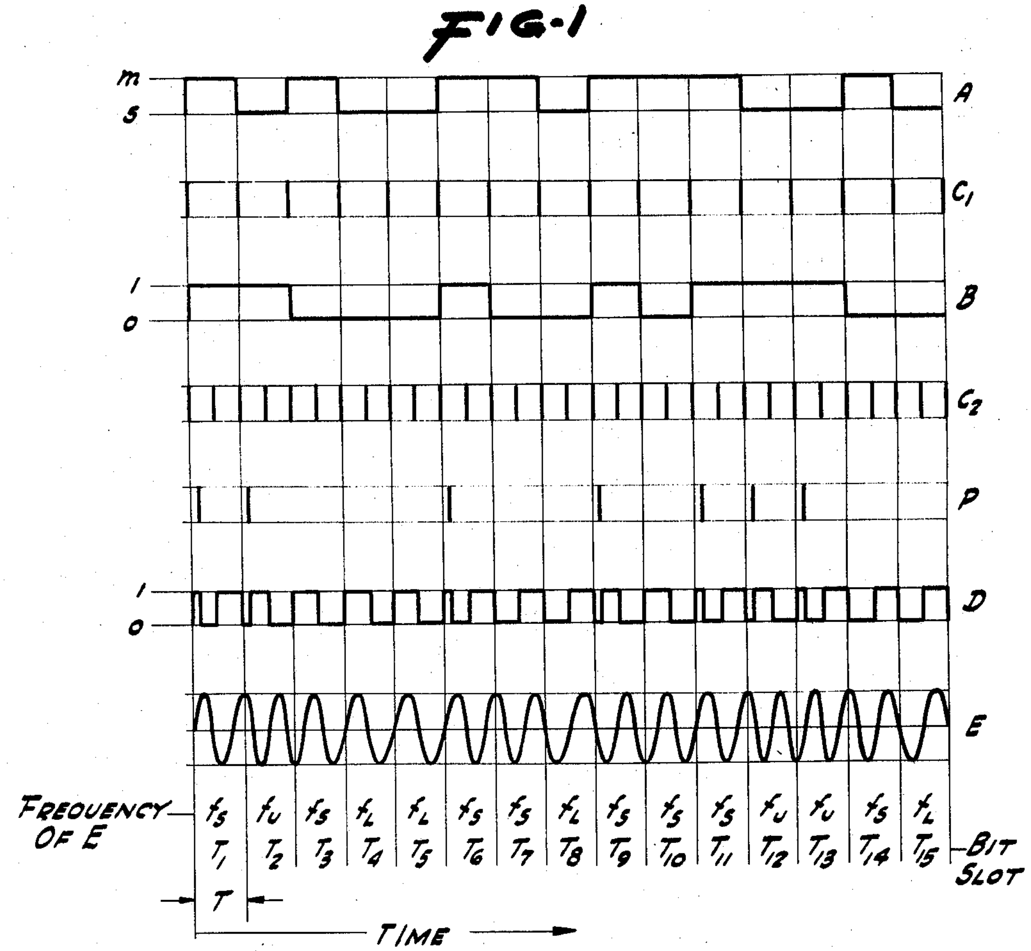

and in this frequency-modulated signal the two discrete amplitude levels of the digital data waveform are identifiable from the above-noted separate frequencies and also from the phase conditions at each transition point of the signal between bit intervals thereof.

This invention relates generally to the processing of digital data for transmission over a communications channel of limited bandwidth and recovery of the original data intelligence from the transmitted signal, and is more particularly directed to the synchronous frequency modulation duobinary processing of digital data with attendant advantages in the transmission and recovery of the data.

Frequency modulation (FM) systems are extensively employed to facilitate the transmission of serialized digital data over a communications channel of limited bandwidth derived on a conventional wire line, cable, carrier, microwave, or equivalent communicatitons medium. These FM systems are typically arranged such that the digital data keys a voltage-controlled oscillator which generates a first frequency in response to one amplitude level of the data waveform and a second frequency in response to the second amplitude level thereof. The keyed oscillator frequencies may then be transmitted directly over the transmission medium. In the foregoing FM transmission system, the phase of the frequency shift keyed output is continuous, however the changes from one amplitude level of the input data to the other may occur at any phase of the oscillator signal. The input data and FM output are thus asynchronous, and undesirable keying loss with attendant time jitter are present. In addition, the apparatus required in keyed oscillator conversion systems of the foregoing type is relatively complex and expensive, particularly because of the high degree of frequency stability required of the oscillators.

Aside from the above-noted disadvantages in the FM processing of digital data, further disadvantages arise from the data being conventionally processed in the straight binary mode. In the straight binary mode of processing, the rate of data transmission is limited in accordance with Nyquist's Rule, and the maximum transmission rate cannot be increased without increasing the bandwidth of the communications channel.

The present invention overcomes the hereinbefore noted limitations and disadvantages in the conventional FM straight binary processing of digital data by providing for the transmission of a synchronous FM duobinary signal having dual properties from which original digital data encoded in the signal may be readily recovered. More particularly, a synchronous digital FM signal is provided wherein the bit rate of the original digital data is locked with the carrier frequency of the FM signal and the FM signal has a continuous phase at the transition points between the digits. As a result, keying loss and attendant time jitter are effectively reduced to zero and intersymbol interference is negligible. The signal has one of three possible frequencies in each digit time slot of the original data as well as four phases at the transition points between the digits. These dual properties of the signal (i.e., distinct frequencies and phases) in connection with appropriate duobinary coding of the original digital data, permit recovery of the digital data by either of two methods. The digital data may be derived from the frequency properties of the signal in a conventional manner utilizing an FM discriminator or axis-crossing detector. Alternatively, the data may be derived from the phase properties of the signal in the manner set forth in my copending application Ser. No. 434,595 for "Differentially Coherent Duobinary Signal Reception," and assigned to the same assignee as the present application. In addition, the spectral density of the synchronous FM duobinary signal is such as to contain only continuous components, while discrete components are absent. This is advantageous in that the continuous components carry all of the data information, while the discrete components carry none and yet contain half the signal power. Signal power is thus reduced. Finally, the duobinary form of the signal affords a two-to-one bandwidth compression of the communications medium compared to straight binary data processing.

Figure 2:
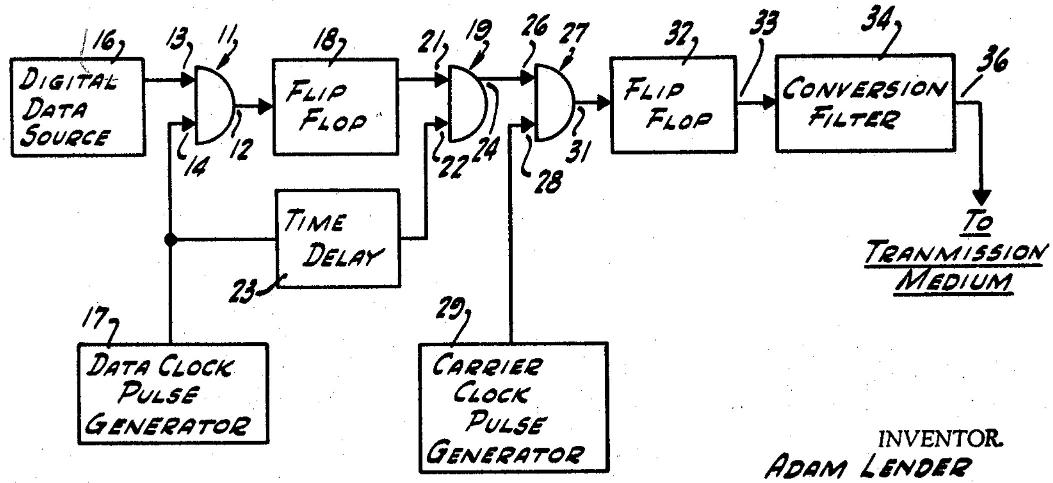

The invention will be better understood upon consideration of the following detailed description thereof in conjunction with the accompanying drawings, wherein:

FIGURE 1 is a graphical illustration of various waveshapes representative of a process of converting digital data to a synchronous FM duobinary signal in accordance with the invention, and FIGURE 2 is a schematic circuit diagram of a system for conducting the process.

Considering now the invention in detail with respect to the conversion of digital data to a synchronous FM duobinary signal, and referring to FIGURE 1 of the drawing, an input digital waveform A has two discrete amplitude levels S and M, respectively representative of "space" and "mark" conditions, for example. Waveform A has a bit time slot or digit interval of T seconds, and therefore a bit speed of $1/T$ bits per second, as is apparent from the data clock pulses $C_1$. The digital waveform A has a zero-memory sequence, and in accordance with the broad aspects of the process hereof, the zero-memory sequence is converted to a new limited-memory binary chain. The term zero-memory sequence defines a sequence of binary digits in which each digit has a value of either "mark" or "space" that is independent of a previous digit or digits, and it is intended at this point to identify the fact that the present invention does not require any precoding of incoming binary data, although the invention is equally operable upon coded data streams. The term "limited-memory binary chain," as employed herein, is taken to mean a sequence of binary digits wherein each digit value of "mark" or "space" depends upon a previous digit or digits but does not depend upon all of the digits in the chain. As explained further below, the present process provides for each digit value to depend upon the digit value of the second preceding digit, and thus the memory is herein limited to two digits back of the digit in question. Each binary digit of the new chain represents the modulo 2 addition of the corresponding input digit and the symbol in the new chain which is two digits back. Next, the limited memory chain modulates a carrier in a strictly binary fashion such as that binary 1's represent one phase and binary 0's the other phase of the carrier 180° apart. Of particular importance to the ends of the invention, the frequency of the carrier, $f_c$, is selected such that the number of half-cycles per digit is an integer. In other words, the carrier frequency is given by: $f_c=k/2T$, where $k$ is an integer equal to or greater than 2.

The above-noted development of the binary modulated carrier is best accomplished by first deriving the digital differential of waveform A, such differential being represented at B. This may be accomplished, for example, by digitally combining the clock pulses $C_1$ and the waveform A in such a manner as to produce pulses in time correspondence with the clock pulses for those clock pulses occurring in coincidence with one level of the data wavefrom, but not for clock pulses occurring in coincidence with the other level. In the illustrated case, pulses are produced for "marks" but not for "spaces" of the digital data A. The resulting pulses are used to produce a square wave which has its edges coincident with the pulses and which is the digital differential waveform B. Producing a square wave from pulses is herein referred to as complementing The digital differential B is in turn combined with the clock pulses $C_1$, slightly delayed by a time very small compared to the bit interval T. In this regard, output pulses P are produced in response to coincidences between the delayed clock pulses and one binary condition of digital differential B (in the present case binary 1), but not the other (in the present case binary 0). Pulses P are then combined with carrier clock pulses $C_2$ having a rate selected in accordance with the previously noted relation: $f_c=k/2T$. In the illustrated case $k=2$ and the carrier clock rate is hence twice the data clock rate and the carrier frequency is $1/T$, i.e., the bit rate of the carrier clock pulses $C_2$ is $kC_1$. The manner of combining the pulses P and $C_2$ is such that output pulses are produced responsive to the pulses P or the pulses $C_2$, and these output pulses are complemented to result in the waveform D, which is the previously noted limited-memory chain modulated carrier.

Considering now some characteristics of waveform D, it is to be noted that same includes the previously noted modulo 2 addition of corresponding digits of the input data A and the respective symbols or digits in waveform D which are two digits back. More particularly, the relationship between waveshapes A and D is such that the digit at A is a binary 0, or "space," whenever the corresponding time slot at D has the same phase as the second slot back at D. Otherwise, the digit at A is a binary 1, or "mark." In this regard, note for example time slot $T_5$, which is a space in waveshape A. The phases of waveshape D in time slots $T_5$ and $T_3$ are "in-phase." Now consider time slot $T_6$, which is a mark in waveshape A. The phases of waveshape D in time slots $T_6$ and $T_4$ are "out-of-phase." In addition, the carrier frequency $f_c$ of waveshape D, as noted previously, is related to the bit time slot T of the original data A by the relationship $f_c=k/2T$, and is therefore in synchronism therewith. Moreover, it can be shown that the signal D contains two symmetrical sidebands having a center frequency $f_s$ which is given by:

$$f_s=\frac{2k\pm 1}{4T}$$

where the plus is for the upper and minus for the lower sideband.

The next step in the data process of the present invention is to select either the upper or lower sideband contained in signal waveshape D while constraining the spectral density of the selected sideband to contain only continuous components such that discrete components are absent. In this regard, it can be shown that the desired constrained spectral density W($f$) is given by:

$$W(f)=\frac{pq}{T}|G(f)|^2 Z\begin{bmatrix}s_u(f)\\ s_1(f)\end{bmatrix}\begin{matrix}\text{for upper sideband}\\ \text{for lower sideband}\end{matrix}$$

where $p$ is the probability of mark in the sequence of input data A, $q=1-p$, G($f$) is the Fourier transform of waveshape D and expressed by:

$$G(f)=\frac{\tan \pi fT/k}{\pi f}\begin{pmatrix}\sin \pi fT\\ \cos \pi fT\end{pmatrix}\begin{matrix}\text{for } k \text{ even}\\ \text{for } k \text{ odd}\end{matrix}$$

Z is expressed by:

$$Z=\frac{1}{(1-2p^2-2(1-2p)\cos 4\pi fT+1)}$$

and $S_u(f)$ and $S_1(f)$ are defined by:

$$S_u(f)=\tfrac{1}{2}[1+(-1)^k \sin 2\pi fT]$$

for $$\frac{2k-1}{4T}\leq f\leq\frac{2k+3}{4T}$$

and zero elsewhere, and $$S_1(f)=\tfrac{1}{2}[1-(-1)^k \sin 2\pi fT]$$

for $$\frac{2k-3}{4T}\leq f\leq\frac{2k+1}{4T}$$

and zero elsewhere.

The selection from waveshape D of a sideband with constrained spectral density in accordance with the considerations advanced above results in a waveshape E which is a synchronous FM duobinary signal containing intelligence of the original digital data A. It is particularly important to note that the signal has dual properties, i.e., distinct frequencies and phases, which moreover are uniquely related to the original digital data A. More particularly, each time slot T of the signal has one of three frequencies, namely the previously defined center frequency, $f_s$, and upper and lower frequencies $f_u$ and $f_1$ located at $f_s\pm\frac{1}{4}T$. One of these two extreme frequencies is the carrier frequency $f_c$, depending upon which sideband is selected. In the illustrated case, the upper sideband is selected and $f_1=f_c$. The center frequency $f_s$ is indicative of one level, e.g., "mark" as shown, while the extreme frequencies $f_u$ and $f_1$ are both indicative of the other level, in this case "space," of the original data A. This will become evident upon comparing the levels of each time slot of the data signal A to the frequency in the corresponding time slot of the synchronous FM duobinary signal E. Thus by observing the frequency in each time slot of the signal E, the original digital data signal A is immediately ascertainable. By virtue of this frequency property of the synchronous FM duobinary signal, the original data may be reconstructed in a conventional manner by averaging the axis-crossings of the carrier.

With regard to the phase property of the synchronous FM duobinary signal E, it should be noted that the signal has four distinct phases at the transition points between time slots. The two extreme frequencies $f_u$ and $f_1$ are always such that one extreme, e.g., $f_1$, has an even number of half-cycles per bit, and the other extreme, e.g., $f_u$, has an odd number of half-cycles per bit. The center frequency, $f_s$, has an odd number of quarter-cycles per bit. Therefore, the four possible phase conditions at the transition points are (note that it is the phase at the beginning of adjacent digits which is considered):

(1) Even number of half-cycles followed by center frequency—phases differ by 0°;

(2) Even preceded by center—phases differ by 90° and the magnitude of even is greater than that of center;

(3) Odd followed by center—phases differ by 180°;

(4) Odd preceded by center—phases differ by 90° and magnitude of odd is less than that of center.

The original data may be reconstructed from the above-noted phase properties in accordance with the differentially coherent detection process disclosed in the previously noted application Ser. No. 434,595.

The process of converting digital data to a synchronous FM duobinary signal in accordance with the present invention may be readily conducted with relatively simple ordinary digital circuits in appropriate combination. One suitable circuit is illustrated in FIGURE 2, which circuit includes an AND-gate 11, or the like, having an output 12 which is energized only when pulses exist coincidently at a pair of inputs 13 and 14. A digital data source 16 is connected to input 13 to apply the data waveform A thereto, while the data clock pulses $C_1$ are applied to input 14 by means of a clock pulse generator 17 connected thereto. Pulses occur at output 12 of circuit 11 in response to the clock pulses from generator 17 when one binary state (in the present case 1 or mark) of the data from source 16 exists at input 13, but not when the other binary state exists thereat. The output 12 is connected to a flip-flop 18 and the output pulses are complemented by the flip-flop to produce the digital differential waveform B at the output thereof.

A second AND-gate 19 is provided with one input 21 connected in receiving relation to the output of flip-flop 18 and a second input 22 connected to the clock pulse generator 17 through a time delay circuit 23 that delays the clock pulses $C_1$ for a time that is very short compared to the time slot T of the digital data A. The gate 19 provides pulses P at its output 24 only in response to coincidences of the delayed clock pulses with one level (in the present case binary 1) of waveform B, but not with the other (i.e., binary 0). The pulses P at the output of gate 19 are applied to one input 26 of an OR-gate 27, the other input 28 of which is connected to a carrier clock pulse generator 29. The clock pulses $C_2$ of generator 29 are related to the clock pulses $C_1$ in accordance with the considerations discussed hereinbefore. Both the pulses P and clock pulses $C_2$ appear at the output 31 of gate 27 and complement a flip-flop 32 connected thereto. As a result, the waveshape D is produced at the output 33 of flip-flop 32.

The output 33 of flip-flop 32 is connected to a conversion filter 34, or equivalent means for selecting either the upper or lower sideband of the waveshape D and appropriately constraining the spectral density of the selected sideband to continuous components. In this regard, the band-pass characteristic of the filter is symmetrical and centered at the center frequency $$f_s=\frac{2k\pm 1}{4T}$$

The filter attenuation is of relatively low order for frequencies between $f_l$ and $f_u$ and increases sharply for frequencies less than $f_l$ and greater than $f_u$. For the upper sideband having center frequency $$f_s=\frac{2k+1}{4T}$$

the filter attenuation is substantially infinite at frequencies equal to $$\frac{2k-1}{4T}$$

and $$\frac{2k+3}{4T}$$

For the lower sideband having center frequency $$f_s=\frac{2k-1}{4T}$$

the filter attenuation is substantially infinite at frequencies equal to $$\frac{2k-3}{4T}$$

and $$\frac{2k+1}{4T}$$

With such characteristics, the waveform D in passing through the filter 34 is converted to the synchronous FM duobinary signal E at the filter output 36, which is connected to a transmission medium.

Of course, suitable receiver means (not shown) may be provided at the receiving end of the transmission medium to reconstruct the original data A generated by source 16 from the signal E. For example, the differentially coherent reception system disclosed in the previously referenced application Ser. No. 434,595, or conventional FM demodulation means may be employed to this end.

Although the invention has been described hereinbefore with respect to specific steps in the method and a single, preferred embodiment of the apparatus thereof, no limitations are intended nor are to be implied therefrom, reference being made to the appended claims for a precise delineation of the true spirit and scope of the invention.

What is claimed is:

1. A data process comprising converting a digital data waveform having a series of pulses of two discrete amplitude levels and a predetermined bit interval T to a FM signal for transmission having a center frequency $f_s$ and two extreme frequencies $f_u$ and $f_l$ symmetrically disposed on opposite sides of said center frequency and separate therefrom by $\pm 1/4T$, said center frequency $f_s$ being expressed by:

$$f_s=\frac{2k\pm 1}{4T}$$

where $k$ is an integer equal to or greater than 2, one of said extreme frequencies being a carrier equal to $k/2T$, and observing the occurrence of said center frequency in bit intervals of said FM signal corresponding to bit intervals of said digital data waveform as an indication of one of said levels thereof while observing the occurrence of either of said extreme frequencies in said bit intervals as an indication of the other of said levels of said digital data waveform.

2. A data process comprising converting a digital data waveform having a series of pulses of two discrete amplitude levels and a predetermined bit interval T to an FM signal for transmission having a center frequency $f_s$ and two extreme frequencies $f_u$ and $f_l$ symmetrically disposed on opposite sides of said center frequency and separated therefrom by $\pm 1/4T$, said center frequency being expressed by $$f_s=\frac{2k\pm 1}{4T}$$

where $k$ is an integer at least equal to 2, one of said extreme frequencies being a carrier equal to $k/2T$, said FM signal having one of said center or extreme frequencies in each bit interval of said FM signal corresponding to a bit interval of said digital data waveform, said FM signal having one of four phase conditions at each transition point of said signal between bit intervals thereof, said frequencies in bit intervals of said signal being representative of the level of said digital data waveform in corresponding bit intervals thereof, said phases at said transition points being representative of transitions between the levels of said digital data waveform.

3. A data process comprising converting a digital data waveform having a series of pulses of two discrete amplitude levels and a predetermined digit interval T to a limited-memory binary chain wherein each binary digit thereof is representative of modulo 2 addition of the corresponding digit of the data waveform and the digit of the binary chain two digits back, binarily modulating a carrier with said chain to produce a modulated carrier signal wherein one binary condition of the chain represents one phase and the other binary condition of the chain represents the other phase of the carrier 180° apart, said carrier having a frequency $f_c$ given by: $f_c=k/2T$, where $k$ is an integer at least equal to 2, said modulated carrier signal containing two symmetrical sidebands having center frequencies $f_s$ given by:

$$f_s=\frac{2k\pm 1}{4T}$$

and selecting one of said sidebands while constraining the spectral density thereof to contain only continuous components to provide an FM signal comprised of the center frequency of the selected sideband and two extreme frequencies symmetrically disposed on opposite sides thereof and separated therefrom by $\pm 1/4T$, one of said extreme frequencies being said carrier $f_c$, whereby the occurrence of said center frequency of said selected sideband in digit intervals of said FM signal corresponding to digit intervals of said data waveform is representative of one level thereof while the occurrence of either of said extreme frequencies in digit intervals of said FM signal corresponding to digit intervals of said data waveform is representative of the other level thereof.

4. The data process of claim 3, further defined by said spectral density of the selected sideband being constrained to provide a spectral density W(*f*) given by:

$$W(f)=\frac{pq}{T}|G(f)|^2 Z\begin{bmatrix} s_u(f) \\ s_1(f) \end{bmatrix}\begin{matrix}\text{for upper sideband}\\ \text{for lower sideband}\end{matrix}$$

where $f$ denotes frequency, $p$ is the probability of one level in the sequence of said digital data waveform, $q=1-p$, G(*f*) is the Fourier transform of said modulated carrier signal and expressed by:

$$G(f)=\frac{\tan \pi fT/k}{\pi f}\begin{pmatrix}\sin \pi fT \\ \cos 2fT\end{pmatrix}\begin{matrix}\text{for } k \text{ even}\\ \text{for } k \text{ odd}\end{matrix}$$

Z is expressed by:

$$Z=\frac{1}{(1-2p)^2-2(1-2p)\cos 4\pi fT+1}$$

and $S_u(f)$ and $s_1(f)$ are defined by:

$$S_u(f)=\tfrac{1}{2}[1+(-1)^k \sin 2\pi fT]$$

for $$\frac{2k-1}{4T}\leq f\leq\frac{2k+3}{4T}$$

and zero elsewhere, and $$S_1(f)=\tfrac{1}{2}[1-(-1)^k \sin 2\pi fT]$$

for $$\frac{2k-3}{4T}\leq f\leq\frac{2k+1}{4T}$$

and zero elsewhere.

5. A process of converting a digital data waveform having a series of pulses of two discrete amplitude levels and a predetermined digit interval T to a synchronous FM duobinary signal comprising the steps of converting said digital data waveform to the digital differential thereof by digitally combining clock pulses with said data waveform in a manner to produce output pulses in time correspondence with said clock pulses for those clock pulses in coincidence with one level of the data waveform but not for clock pulses occurring in coincidence with the other level of said data waveform and complementing said output pulses, digitally combining said digital differential with said lock pulses delayed by a time very small compared to said digit interval T to produce second output pulses in response to coincidences between the delayed clock pulse and one level of said digital diffedential but not the other, digitally combining said second output pulses with carrier clock pulses having a rate commensurate with a frequency $f_c$, expressed by $f_c=k/2T$, where $k$ is an integer equal to or greater than 2, in a manner to produce third output pulses responsive to said second output pulses or said carrier clock pulses and complementing said third output pulses to produce a limited-memory chain modulated carrier signal, and passing a band of frequencies of said modulated carrier signal having a center frequency $f_s$ given by:

$$f_s=\frac{2k\pm 1}{4T}$$

and extreme frequencies separated therefrom by $\pm 1/4T$ while suppressing frequencies outside of said band.

6. A duobinary data process comprising the steps of converting a digital data waveform having a series of pulses of two discrete amplitude levels and a predetermined digit interval T to the digital differential thereof by digitally combining clock pulses with said data waveform in a manner to produce output pulses in time correspondence with said clock pulses for those clock pulses in coincidence with one level of the data waveform but not for clock pulses occcurring in coincidence with the other level of said data waveform and complementing said output pulses, digitally combining said digital differential with said clock pulses delayed by a time very small compared to said digit interval T to produce second output pulses in response to coincidences between the delayed clock pulse and one level of said digital differential but not the other, digitally combining said second output pulses with carrier clock pulses having a rate comensurate with a frequency $f_c$, expressed by $f_c=k/2T$, where $k$ is an integer equal to or greater than 2, in a manner to produce third output pulses responsive to said second output pulses or said carrier clock pulses and complementing said third output pulses to produce a limited-memory chain modulated carrier signal, and passing a band of frequencies of said modulated carrier signal having a center frequency $f_s$ given by:

$$f_s=\frac{2k\pm 1}{4T}$$

and extreme frequencies separated therefrom by $\pm 1/4T$ while suppressing frequencies outside of said band to provide a synchronous FM duobinary signal having one of said center or extreme frequencies in each time interval of said duobinary signal corresponding to a digit interval of said data waveform, and observing the occurrence of said center frequency in said time intervals of said duobinary signal as an indication of the existence of one level of said data waveform while observing the occurrence of either of said extreme frequencies in said time intervals of said duobinary signal as an indication of the existence of the other level of said data waveform in the corresponding digit intervals thereof.

7. A synchronous FM duobinary system comprising means for converting a digital data waveform having a series of data pulses of two discrete amplitude levels and digit intervals T to a limited-memory binary chain modulated carrier waveform wherein the carrier frequency $f_c$ is given by $f_c=k/2T$, $k$ being an integer at least equal to 2, said modulated carrier waveform varying between binary 0 and 1 conditions and having digit intervals equal to and synchronized with those of said data waveform with the digits of said modulated carrier waveform representing modulo 2 addition of corresponding digits of said data waveform and digits of said modulated carrier waveform two digits back, said modulated carrier waveform containing two sidebands having center frequencies $f_s$ given by:

$$f_s=\frac{2k\pm 1}{4T}$$

and extreme frequencies separated from said center frequencies by $\pm 1/4T$ with one extreme frequency of each sideband being equal to said carrier frequency $f_c$, and filter means receiving said modulated carrier waveform, said filter means having a symmetrical attenuation characteristic centered at the center frequency of a first of said sidebands, said characteristic presenting negligible attenuation to frequencies between the extreme frequencies of said first sideband and sharply increasing attenuation to frequencies outside of said first sideband.

8. A system according to claim 7, further defined by said characteristic of said filter providing substantially infinite attenuation at frequencies $2k\pm1/4T$ and $2k\pm3/4T$ when the filter characteristic is centered at $2k\pm1/4T$.

9. A system according of claim 7, further defined by said means for converting a digital data waveform to a limited-memory binary chain modulated carrier waveform comprising a data clock source for generating data clock pulses in synchronism with said data pulses, means coupled in receiving relation to said data waveform and said clock source for generating the digital differential of said data waveform, means coupled to said clock source for delaying the clock pulses therefrom by time increments very small compared to said digit intervals T, means coupled in receiving relation to said digital differential and the delayed clock pulses for generating output pulses in response to coincidences of said delayed clock pulses and one amplitude level of said digital differential but not the other, a carrier clock source for generating carrier clock pulses in synchronism with said data clock pulses and at a rate $k$ times the rate thereof, and means coupled in receiving relation to said carrier clock pulses and said output pulses for complementing same and producing said modulated carrier waveform.

10. A synchronous FM duobinary signal transmitting circuit comprising an AND gate having first and second inputs and an output, a digital data source connected to the first input of said gate and generating data pulses having two discrete levels and a digit interval T, a data clock pulse source connected to the second input of said gate and generating clock pulses in synchronism with said data pulses and at the rate thereof, a flip-flop circuit connected to the output of said gate and complemented by pulses therefrom, a second AND-gate having first and second inputs and an output, means connecting the first input of said second AND-gate to the output of said flip-flop, time delay means connected between said data clock pulse source and the second input of said second AND-gate, an OR-gate having first and second inputs and an output, means connecting the first input of said OR-gate to the output of said second AND-gate, a carrier clock pulse source connected to said second input of said OR-gate and generating carrier clock pulses in synchronism with said data clock pulses at $k$ times the rate thereof, $k$ being an integer at least equal to 2, a second flip-flop circuit connected to the output of said OR-gate and complemented by pulses therefrom, and band-pass filter means connected to the output of said second flip-flop circuit, said filter means having a symmetrical attenuation characteristic centered at either of two frequencies $$f_s=\frac{2k\pm1}{4T}$$

and negligibly attenuation a band of frequencies between extreme frequencies of $$f_s\pm\frac{1}{4T}$$

while sharply attenuating frequencies outside of this band.

References Cited

UNITED STATES PATENTS

| | | | |
|---|---|---|---|
| 3,263,185 | 7/1966 | Lender. | |
| 3,271,588 | 9/1966 | Minc | 325—30 X |

ROBERT L. GRIFFIN, *Primary Examiner.*

JOHN W. CALDWELL, *Examiner.*

J. T. STRATMAN, *Assistant Examiner.*